UNITED STATES PATENT OFFICE.

HERMAN ROSENBERG, OF NEW YORK, N. Y., ASSIGNOR TO STANDARD VARNISH WORKS, OF NEW YORK, N. Y., A CORPORATION OF NEW YORK.

IMITATION LEATHER AND PROCESS OF PRODUCING IT.

SPECIFICATION forming part of Letters Patent No. 695,627, dated March 18, 1902.

Application filed January 15, 1902. Serial No. 89,852. (No specimens.)

*To all whom it may concern:*

Be it known that I, HERMAN ROSENBERG, a citizen of the United States, and a resident of the borough of Manhattan, in the city and State of New York, have invented a new and useful Imitation Leather and Process of Producing It, of which the following is a specification.

My invention relates to imitation leather and the process of producing it, with the end in view of providing a serviceable article resembling leather, which shall have advantages over leather for many uses and which may be supplied at a cost materially less than the cost of genuine leather.

With this end in view my invention consists in coating a textile fabric—cotton drills, for example—with rubber, then vulcanizing the rubber-coated fabric, then applying to the rubber-coated surface a liquid mixture composed of vegetable oil, sulfur, turpentine, benzene, and a coloring substance, and finally vulcanizing this coating on the vulcanized rubber coating.

My invention further consists in an imitation leather consisting of a textile fabric having an inner coating of rubber vulcanized thereon and an outer coating composed of oil, sulfur, turpentine, benzene, and a coloring substance vulcanized thereon.

In practice a piece of textile fabric—such, for example, as cotton drills—is coated with a rubber solution—such, for example, as is commonly used for making so-called "rubber cloth"—and this coating of rubber is vulcanized on the fabric. The outer coating is then prepared by thoroughly mixing a vegetable oil, sulfur, turpentine, benzene, and a coloring substance in the following relative proportions: fifteen gallons vegetable oil—linseed-oil, for example—thirteen pounds sulfur, fifteen gallons turpentine, fifteen gallons benzene, and forty-five pounds coloring substance—burnt umber, for example. The coloring substance may be ground in the mixture of oil, sulfur, turpentine, and benzene and may be varied in quantity to produce different shades. The proportions of the other substances composing the mixture may also be varied to produce a heavier or lighter coating to suit the purposes for which the imitation leather is to be used. This outer coating after being applied to the vulcanized rubber coating is vulcanized, and the product is then complete.

If so desired, the rubber coating may be "pebbled," as it is called, before it is vulcanized, and this appearance will be retained after the final coating is vulcanized.

The imitation leather thus produced is waterproof, will withstand heat and cold without any tendency to crack or deteriorate, and may be folded and worked into various shapes without any danger of breaking the coating.

What I claim is—

1. The process of producing imitation leather consisting in coating a textile fabric with rubber, vulcanizing the rubber coating on the fabric, applying a liquid coat composed of vegetable oil, sulfur, turpentine, benzene and coloring-matter, and vulcanizing the said coat on the vulcanized rubber coat.

2. An imitation leather composed of a textile fabric, a coat of rubber vulcanized on the textile fabric and a coat consisting of oil, sulfur turpentine, benzene and coloring-matter, vulcanized on the vulcanized rubber coat.

In testimony that I claim the foregoing as my invention I have signed my name, in presence of two witnesses, this 11th day of January, 1902.

HERMAN ROSENBERG.

Witnesses:
JOHN C. DOLPH,
E. L. PHILLIPS.